United States Patent

Sato et al.

[11] Patent Number: 5,566,054
[45] Date of Patent: Oct. 15, 1996

[54] OUTSIDE-INSULATED ELECTRONIC ELEMENT OF CUBIC CHIP TYPE STORABLE IN A DISK PACKAGE

[75] Inventors: Hideaki Sato; Keiji Takada; Koichi Morimoto, all of Tokyo, Japan

[73] Assignee: NEC Corporation, Tokyo, Japan

[21] Appl. No.: 498,599

[22] Filed: Jul. 6, 1995

[30] Foreign Application Priority Data

Jul. 19, 1994 [JP] Japan ......................... 6-166863

[51] Int. Cl.$^6$ .............. H05K 7/00; H01L 23/04; H01L 23/48
[52] U.S. Cl. ............. 361/807; 174/52.1; 174/52.4; 257/730; 257/787; 257/690; 257/692; 361/821
[58] Field of Search ................. 174/52.1–52.4; 257/690, 692, 693–696, 678, 787, 730; 264/272.11–272.18; 361/728, 820, 821, 535, 538, 539; 437/215, 217, 219, 224; 439/68, 70, 71, 72, 330, 525, 526, 928; 206/701, 710, 711, 713, 722, 723

[56] References Cited

U.S. PATENT DOCUMENTS 5,388,024  2/1995  Galvagni ..................... 361/309

FOREIGN PATENT DOCUMENTS

| 2146223 | 3/1973 | France . |
| 60-220922 | 5/1985 | Japan ..................... 361/309 |
| 63-239965 | 10/1988 | Japan ..................... 257/696 |
| 1-32737 | 5/1989 | Japan . |
| 2208333 | 3/1989 | United Kingdom ............ 439/68 |

OTHER PUBLICATIONS

Patent Abstracts of Japan, vol. 16, No. 429 (E–1261), Sep. 8, 1992 and JP 4150042, May 22, 1992.
Patent Abstracts of Japan, vol. 13, No. 285 (E–780) and JP 1068915, Mar. 15, 1989.

*Primary Examiner*—Donald A. Sparks
*Attorney, Agent, or Firm*—Popham Haik Schnobrich & Kaufman, Ltd.

[57] ABSTRACT

An outside-insulated electronic element of a chip type has a body including an electronic element and a plate electrode which extends from the body of the element and is bent along a side surface and a bottom surface of the body of the element. The body of the electronic element including the plate electrode has a trapezoidal shape or a bow or arcuate shape. In this way, the gaps between the electronic elements when placed in a disk package can be reduced to a minimum.

4 Claims, 3 Drawing Sheets

OUTSIDE-INSULATED ELECTRONIC ELEMENT OF CUBIC CHIP TYPE STORABLE IN A DISK PACKAGE

BACKGROUND OF THE INVENTION (1) Field of the Invention

The present invention relates to an outside-insulated electronic element of a cubic chip type, and more particularly to an outside-insulated electronic element which can be stably stored in a disk form package having a spiral groove.

(2) Description of the Related Art

A conventional cubical electronic element 1 of a chip type is shown in FIG. 1, in which a plate type electrode terminal 2 extending from a body 3 of the electronic element is bent along a side surface and a bottom surface of the body 3 of the electronic element, and in which the body 3 of the electronic element including the plate type electrode terminal 2 is a parallelpiped solid (as disclosed, for example, in Japanese Utility Model Application Kokoku Publication No. Hei 1-32737).

Electronic elements of a chip type are placed in a groove spirally formed as shown in FIG. 3 in a disk package 7. When conventional cubical electronic elements 1 of chip types are placed continuously in the spiral groove 5 in the disk package, since each of such elements is shaped as a parallelpiped solid, there remains a large gap 6 as shown in FIG. 2 between one element and an adjacent element. This gap 6 is undesirable as the elements are allowed to move or vibrate due to this gap, thereby leading to the lowering of element reliability and the occurrence of static electricity. Also, during the course of continuous insertion of the parallelpiped solid elements 1 into the disk package, the flow of the elements tends to be hindered and the elements being inserted become stuck in the spiral groove of the disk package, thereby affecting the storing efficiency of the disk packages. A further problem is that, where the shape of the element is a cubic solid with its right and left sides being symmetrical, there is a possibility for the element to be inserted back-to-front, which is a problem in the case of an element having polarity.

SUMMARY OF THE INVENTION

An object of the present invention, therefore, is to overcome the problems existing in the prior art and to provide an outside-insulated electronic element which can be stably stored in a disk package having a spiral groove.

According to one aspect of the invention, there is provided an outside-insulated electronic element of a chip type for being stored in a disk package having a spiral groove, comprising:

a body of the electronic element which has a trapezoidal or arcuate shape; and a plate electrode which extends from the body of the element and is bent along a side surface and a bottom surface of the body of the element, wherein the body of the electronic element including the plate electrode is trapezoidal or arcuate in shape.

According to the invention, since the electronic element is configured in a trapezoidal shape or a bow or arcuate shape, or the electronic element including the plate electrode terminal is configured in such a shape, the gaps between the electronic elements when placed in a disk package can be reduced to a minimum. In this way, the electronic elements are stably stored in the disk package, whereby the electronic element reliability can be ensured and the occurrence of static electricity can be suppressed.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention are explained with reference to the drawings.

Figure 3:
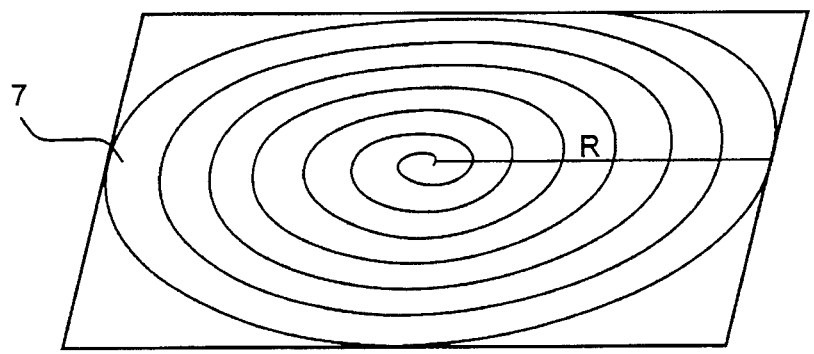
FIG. 3 is a perspective view of a disk package, showing a groove spirally formed in a disk package.

FIG. 3 shows a groove spirally formed in a disk package 7. A radius of curvature of the spiral groove is represented by R.

Figure 4:
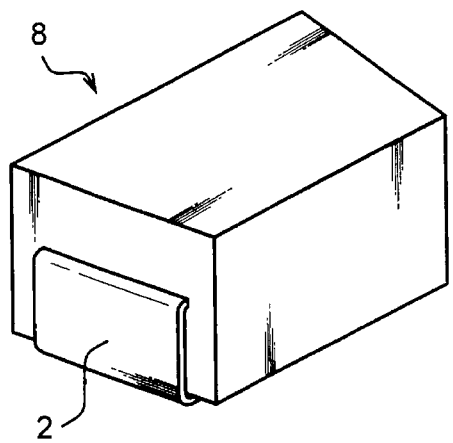
FIG. 4 is a perspective view of an electronic element of a first embodiment according to the invention.

FIG. 4 shows, in a perspective view, an electronic element 8 of a first embodiment according to the invention.

The explanation is given here with reference to a tantalum capacitor as an example.

In the manufacture of the chip tantalum capacitor, a capacitor element is fabricated by forming a negative pole layer on a positive pole body of a tantalum valve action metal powder with an oxide layer, a semiconductor layer, and a graphite layer sequentially interposed therebetween. This capacitor element is electrically connected to a plate type electrode terminal 2 using an electrical welding process or a conductive adhesive agent.

Then, the electronic element 8 including a part of the plate type electrode terminal 2 is resin-molded using, for example, epoxy resin and employing, for example, a transfer mold process using a trapezoidal metal mold. Thereafter, the part of the electrode terminal 2 that is exposed from the body of the trapezoidal electronic element 8 is bent along the body thereof, and this completes the chip tantalum capacitor.

When the chip tantalum capacitors, that is, cubic chip type electronic elements, are continuously placed one after another, the radius of curvature thereof becomes 5 cm which corresponds to that of the outermost disk groove of a chip package.

Figure 1:
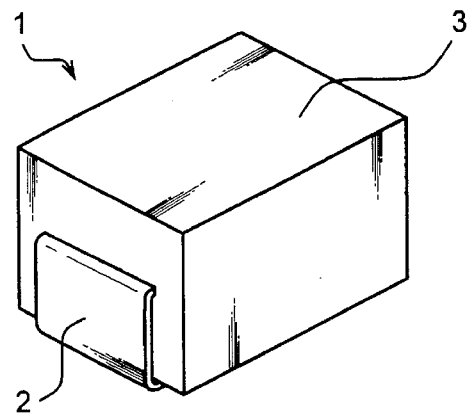
FIG. 1 is a perspective view of a conventional electronic element of a cubical chip type.
Figure 2:
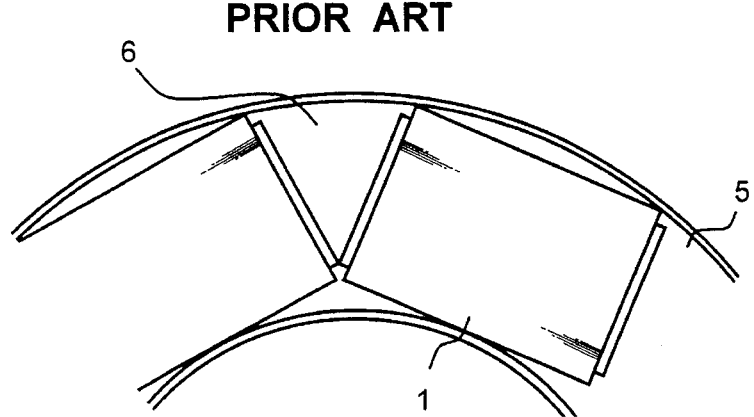
FIG. 2 is a top view of a spiral groove in a part of a disk package in which conventional electronic elements of cubical chip types are inserted.
Figure 5:
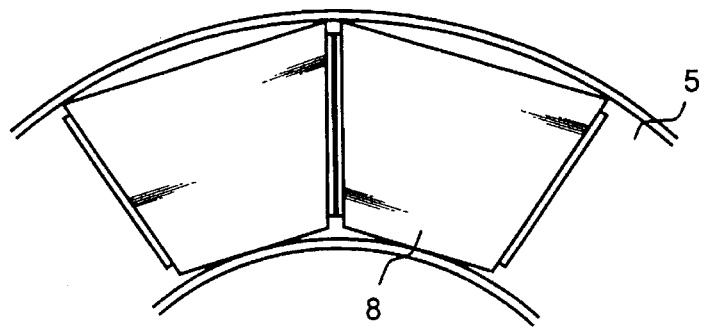
FIG. 5 is a top view of a spiral groove of a part of a disk package in which the electronic elements of the first embodiment according to the invention are inserted.

FIG. 5 shows, when the electronic elements 8 are placed continuously in the spiral groove 5 in the disk package, the gap between one electronic element and the adjacent electronic element is reduced, which is in contrast to that in the prior art shown in FIG. 2.

Figure 6:
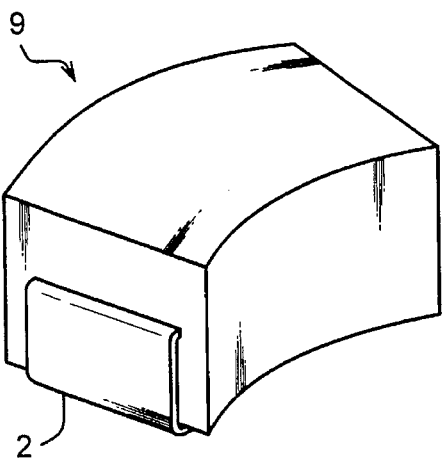
FIG. 6 is a perspective view of an electronic element of a second embodiment according to the invention.

FIG. 6 shows, in a perspective view, an electronic element 9 of a second embodiment according to the invention.

The electronic element 9 is resin-molded using the same transfer mold process as used for the first embodiment explained above. In this case, the electronic element 9 is molded by the metal mold such that the element is shaped into a bow or arcuate form and that a plurality of elements, when placed adjacent to each other, form a radius of curvature of between 1 and 5 cm. The electronic element 9 has a trapezoidal shape combined with a bow shape formed by arcuate front and back surfaces.

Figure 7:
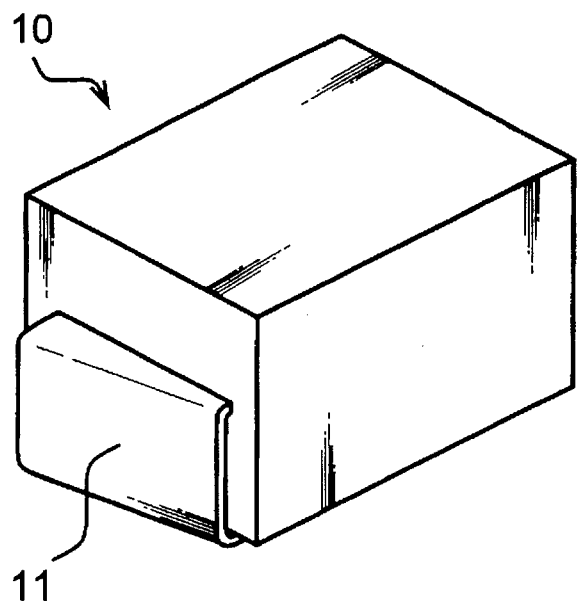
FIG. 7 is a perspective view of an electronic element of a third embodiment according to the invention.

FIG. 7 shows, in a perspective view, an electronic element 10 of a third embodiment according to the invention.

In this embodiment, while the electronic element 10 is configured in a parallelpiped solid shape, the plate electrode terminal 11 extending from the body of the element is inclined and is non-parallel with respect to the side surface thereof. That is, the combination of the body of the electronic element and the plate electrode is trapezoidal in shape. The electronic element 10 and the plate electrode terminal 11 thus configured attain the same advantages as those attained in the first and second embodiments explained above.

Figure 8:
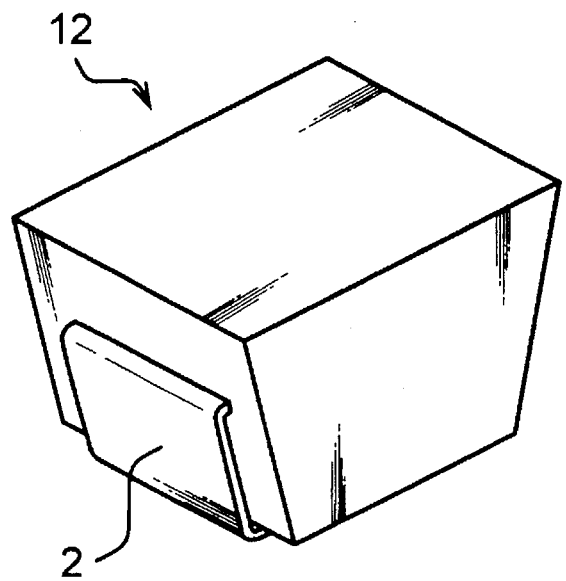
FIG. 8 is a perspective view of an electronic element of a fourth embodiment according to the invention.

FIG. 8 shows, in a perspective view, an electronic element 12 of a fourth embodiment according to the invention.

In this embodiment, the body of the electronic element 12 is shaped such that the front and back surfaces of the body thereof are of a trapezoidal shape. The element 12 thus formed is placed in a disk package with the front facing upward. This embodiment provides the same advantages as those provided by the first through third embodiments explained above.

While the invention has been described in its preferred embodiments, it is to be understood that the words which have been used are words of description rather than limitation and that changes within the purview of the appended claims may be made without departing from the true scope and spirit of the invention as defined by the claims.

What is claimed is:

1. An outside-insulated electronic element of a chip type for being stored in a disk package having a spiral groove, comprising:

a body of the electronic element, said body having a trapezoidal shape; and a plate electrode which extends from said body and is bent along a side surface and a bottom surface of said body, wherein said body and said plate electrode are trapezoidal in shape so that the electronic element can be stored in a disk package having a spiral groove.

2. The outside-insulated electronic element of a chip type according to claim 1, in which the body of said electronic element is shaped into a trapezoidal form by front and back trapezoidal surfaces.

3. The outside-insulated electronic element of a chip type according to claim 1, in which said body of the electronic element is shaped so that when a plurality of elements are placed one after another in the spiral groove, said elements form a radius of curvature between about 1 and 5 cm.

4. An outside-insulated electronic element of a chip type for being stored in a disk package having a spiral groove, comprising:

a body of the electronic element, said body having an arcuate shape; and a plate electrode which extends from said body and is bent along a side surface and a bottom surface of said body, wherein said body and said plate electrode are arcuate in shape so that the electronic element can be stored in a disk package having a spiral groove.

* * * * *